United States Patent
Weeks et al.

(10) Patent No.: US 9,686,918 B2
(45) Date of Patent: Jun. 27, 2017

(54) COMBINE WITH FREE GRAIN EXTRACTION

(71) Applicant: CNH Industrial America LLC, New Holland, PA (US)

(72) Inventors: Matthew D. Weeks, Troupsburg, NY (US); Robert Stewart Boyd, Mount Joy, PA (US)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 14/878,151

(22) Filed: Oct. 8, 2015

(65) Prior Publication Data
US 2017/0099777 A1    Apr. 13, 2017

(51) Int. Cl.
| | |
|---|---|
| *A01D 17/02* | (2006.01) |
| *A01F 12/46* | (2006.01) |
| *A01D 41/12* | (2006.01) |
| *A01F 7/02* | (2006.01) |
| *A01F 12/44* | (2006.01) |

(52) U.S. Cl.
CPC .......... *A01F 12/46* (2013.01); *A01D 41/1243* (2013.01); *A01D 41/1208* (2013.01); *A01F 7/02* (2013.01); *A01F 12/446* (2013.01)

(58) Field of Classification Search
CPC .......... A01F 12/18; A01F 7/00; A01F 12/385; A01F 12/442; A01D 41/12; A01D 41/14; A01D 17/02
USPC .................................................. 460/16, 114
See application file for complete search history.

(56) References Cited

U.S. PATENT DOCUMENTS

| | | | | |
|---|---|---|---|---|
| 3,127,340 A | * | 3/1964 | Buskirk | A01D 75/285 209/152 |
| 3,448,566 A | * | 6/1969 | Van Der Lely | A01D 41/12 460/86 |
| 3,513,646 A |   | 5/1970 | Johnston et al. | |
| 3,604,427 A | * | 9/1971 | Boone | A01F 12/18 460/59 |
| 3,945,178 A | * | 3/1976 | Delfosse | A01F 12/18 460/108 |
| 4,172,500 A | * | 10/1979 | Smith | A01D 29/00 171/101 |
| 4,227,538 A | * | 10/1980 | Long | A01F 11/00 171/119 |
| 4,270,550 A | * | 6/1981 | daSilva | A01F 7/06 460/119 |
| 4,399,825 A | * | 8/1983 | Raineri | A01F 12/18 460/109 |

(Continued)

FOREIGN PATENT DOCUMENTS

| | | |
|---|---|---|
| GB | 1 203 134 | 8/1970 |
| WO | 01/74142 A1 | 10/2001 |

*Primary Examiner* — Árpád Fábián-Kovács
(74) *Attorney, Agent, or Firm* — Patrick M. Sheldrake

(57) ABSTRACT

A combine has a a threshing and separating system to separate grain from crop material and a feeder housing receives crop material from the harvesting head and conveys it to the threshing and separating system. A grain tank has a conveyor for transferring separated grain to the grain tank. The feeder housing has a perforated floor section sufficiently coarse to permit passage of grain to a conveyor beneath the perforated floor section that receives the grain and delivers it to downstream of the threshing and separating system or the separated grain conveyor.

8 Claims, 8 Drawing Sheets

(56) References Cited

U.S. PATENT DOCUMENTS

| | | | |
|---|---|---|---|
| 4,450,671 A | | 5/1984 | Love |
| 4,526,181 A | * | 7/1985 | Heidjann .................. A01F 7/00 460/110 |
| 4,663,921 A | | 5/1987 | Hagstrom et al. |
| 4,796,645 A | * | 1/1989 | Kuchar .................. A01F 12/20 460/107 |
| 5,769,712 A | * | 6/1998 | Honas .................. A01F 12/442 460/114 |
| 5,904,032 A | * | 5/1999 | Rippel .................. A01D 41/04 460/119 |

\* cited by examiner

COMBINE WITH FREE GRAIN EXTRACTION

BACKGROUND OF THE INVENTION

1. Field of the Invention

The present invention relates to agricultural combines, and, more specifically to grain extraction in such machines.

2. Description of the Related Art

Combines are used to harvest agricultural crops such as corn, soybeans, wheat and other grain crops. As the combine is driven through crop fields, the combine cuts the crop, separates the desired crop from the undesired waste, also known as material other than grain (MOG), stores the crop and discards the waste.

In a typical combine, a header is mounted to the front of the combine to gather the crop and feed the crop into the combine for processing. As the combine is driven through the field, the crop material is collected by the header and deposited into a feeder housing. The material is then transported upwardly and into the combine by a feed elevator located within the feeder housing. The crop material then passes through a threshing and separating system. In a rotary combine, the threshing and separating system usually includes a rotor, a threshing concave, a rotor cage and a separating grate. As crop material passes between the rotor, the threshing concave and the separating gate, the crop material is impacted and/or rubbed thereby causing the grain to separate from the stalk material. The stalk material that is separated from the grain is commonly referred to as MOG. Other types of combines are known that perform similar functions using different mechanisms.

After passing through the threshing and separating system, the grain and MOG are deposited onto a grain cleaning system. The grain cleaning system of the typical combine includes a plurality of adjustable cleaning sieves often referred to as a chaffer sieve and a shoe sieve and sometimes a pre-cleaning sieve. These sieves are typically reciprocated back and forth in opposite directions along an arcuate path. This motion has the tendency to separate the grain from the MOG. To further separate the grain from the MOG, a cleaning fan or blower is positioned so as to blow air up through the cleaning sieves. This flow of air tends to blow the MOG, which is typically lighter than grain, rearwardly and out the back of the combine. Grain which is heavier than MOG is allowed to drop through the openings in the sieve.

The clean grain that falls through the cleaning sieves is deposited on a collection panel positioned between the cleaning sieves. The collection panel is angled so as to promote the grain to flow, under the influence of gravity, onto a conveyor such as an auger trough positioned along the lower most edge of the collection panel. The auger trough is typically positioned near the forward end of the cleaning sieves and extends along the width of the sieves. The grain collected in the auger trough is then moved by an auger towards the side of the combine where it is raised by a grain elevator and deposited into a storage tank or grain tank. Other systems also exist that can utilize for example, a loop conveyor system which eliminates the need for a conventional cross auger.

With the progression in the technology of the agricultural field, combines are being called on to be ever more efficient in the extraction of grain and the processing capacity for a given size. As the quantity of grain and MOG delivered to the threshing and separating system increases per unit of time, there is the tendency to locally exceed the capacity of the unit. It has been proposed, in an attempt to make the processing more efficient, to move some of the separating functions into the feeder housing and even the header for the combine. While these approaches have had some limited success, they do so at the expense of added complexity, cost and weight to the agricultural combine.

What is needed in the art therefore is a more efficient extraction of grain within an agricultural combine.

SUMMARY OF THE INVENTION

The present invention seeks to extract grain from the harvested material in a combine upstream of a threshing and separating function.

In one form, the invention is a combine including a mobile frame having a power unit and a harvesting header mounted on the mobile frame for removing crop material from the field and feeding it to a central location. A threshing and separating system is mounted on the mobile frame for separating grain from the crop material and a feeder housing is mounted on the frame for receiving crop material from the harvesting header and conveying it to the threshing and separating system. A grain tank is mounted on the mobile frame and a conveyor transfers separated grain to the grain tank. One of the harvesting header and the feeder housing has a perforated floor section with perforations open sufficiently to pass grain therethrough. A grain collection housing and conveyor are positioned beneath the perforated floor section to receive grain and deliver it to one of downstream of the threshing and separating system and the separated grain conveyor.

One benefit of the invention is a simplified configuration for separating grain from harvested crop material.

Another benefit is a simplified mechanism for such separation.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate embodiments of the invention and such exemplifications are not to be construed as limiting the scope of the invention in any manner.

DETAILED DESCRIPTION OF THE INVENTION

The terms "grain", "straw" and "tailings" are used principally throughout this specification for convenience but it is to be understood that these terms are not intended to be limiting. Thus "grain" refers to that part of the crop material which is threshed and separated from the discardable part of the crop material, which is referred to as non-grain crop material, MOG or straw. Incompletely threshed crop material is referred to as "tailings". Also the terms "forward", "rearward", "left" and "right", when used in connection with the agricultural harvester and/or components thereof are usually determined with reference to the direction of forward operative travel of the harvester, but again, they should not be construed as limiting. The terms "longitudinal" and "transverse" are determined with reference to the fore-and-aft direction of the agricultural harvester and are equally not to be construed as limiting.

Figure 1:
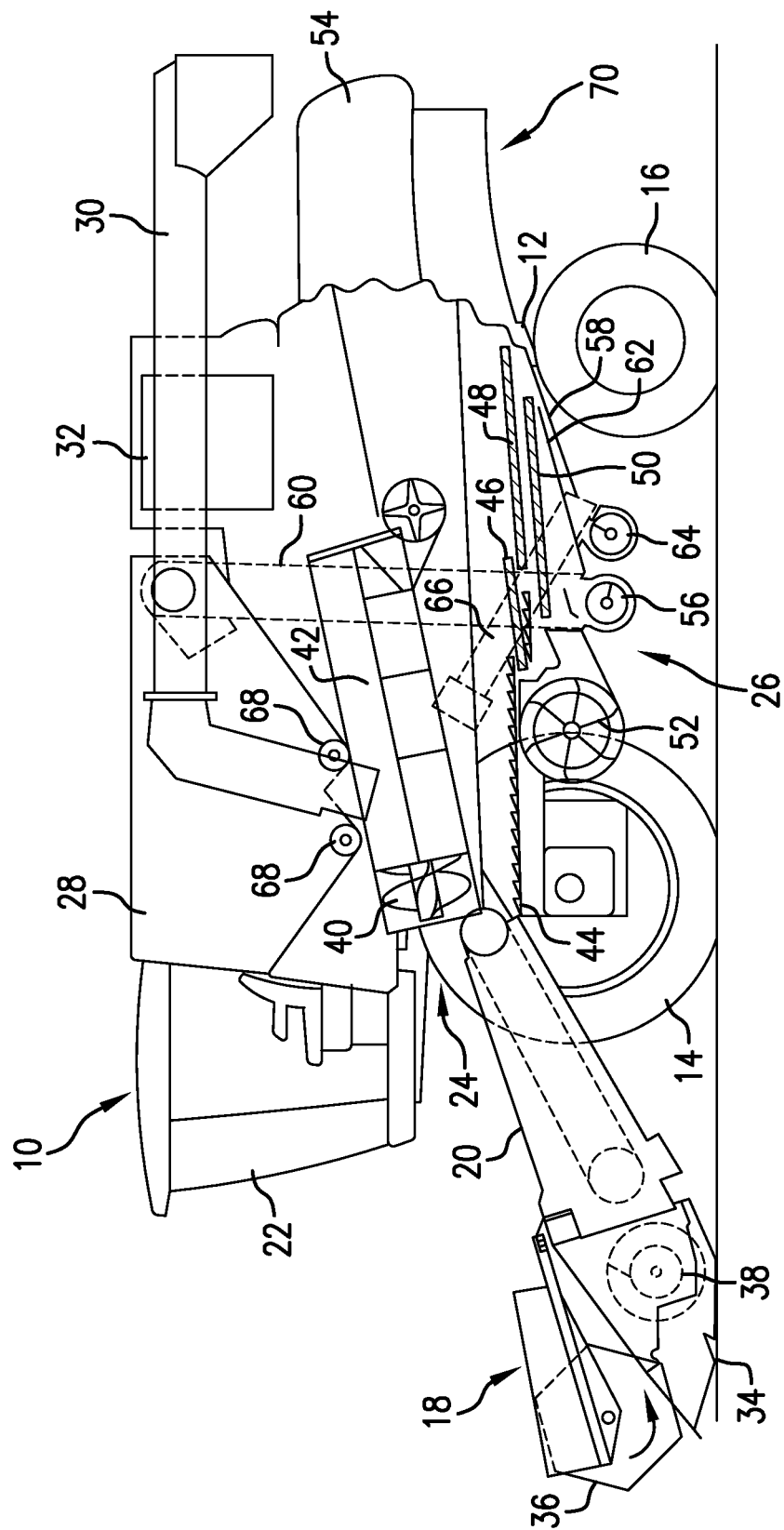
FIG. 1 is a side view of an embodiment of a combine with which the present invention may be utilized.

Referring now to the drawings, and more particularly to FIG. 1, there is shown an agricultural harvester in the form of a combine 10, which generally includes a mobile frame 12, ground engaging wheels 14 and 16, a header 18, a feeder housing 20, an operator cab 22, a threshing and separating system 24, a grain cleaning system 26, a grain tank 28, and an unloading auger 30. It should be appreciated that while the agricultural harvester is shown as combine 10, the agricultural harvester according to the present invention can be any type of construction that allows for crop material to be harvested such as a conventional combine (which does not have a rotor), rotary combine, hybrid combine, chopper harvester, etc.

Front wheels 14 are larger flotation type wheels, and rear wheels 16 are smaller steerable wheels. Motive force is selectively applied to front wheels 14 through a power plant in the form of a diesel engine 32 and a transmission (not shown). Although combine 10 is shown as including wheels, is also to be understood that combine 10 may include tracks, such as full tracks or halftracks.

Header 18 is mounted to the front of combine 10 and includes a cutter bar 34 for severing crops from a field during forward motion of combine 10. A rotatable reel 36 feeds the crop into header 18, and a double auger 38 feeds the severed crop laterally inwardly from each side toward feeder housing 20. Feeder housing 20 conveys the cut crop to threshing and separating system 24, and is selectively vertically movable using appropriate actuators, such as hydraulic cylinders (not shown).

Threshing and separating system 24 is of the axial-flow type, and generally includes a rotor 40 at least partially enclosed by and rotatable within a corresponding perforated concave 42. The cut crops are threshed and separated by the rotation of rotor 40 within concave 42, and larger elements, such as stalks, leaves and the like are discharged from the rear of combine 10. Smaller elements of crop material including grain and non-grain crop material, including particles lighter than grain, such as chaff, dust and straw, are discharged through perforations of concave 42.

Grain which has been separated by the rotor 40 and perforated concaves 42 falls onto a main grain pan 44 and is conveyed toward grain cleaning system 26. Grain cleaning system 26 may include an optional pre-cleaning sieve 46, an upper sieve 48 (also known as a chaffer sieve), a lower sieve 50 (also known as a shoe sieve), and a cleaning fan 52. Grain on sieves 46, 48 and 50 is subjected to a cleaning action by fan 52 which provides an airflow through the sieves to remove chaff and other impurities such as dust from the grain by making this material airborne for discharge from straw hood 54 of combine 10. Main grain pan 44 and pre-cleaning sieve 46 oscillate or reciprocate in a fore-to-aft manner to transport the grain and finer non-grain crop material to the upper surface of upper sieve 48. Upper sieve 48 and lower sieve 50 are vertically arranged relative to each other, and likewise oscillate in a fore-to-aft manner to spread the grain across sieves 48, 50, while permitting the passage of cleaned grain by gravity through the openings of sieves 48, 50.

Clean grain falls to a clean grain auger 56 positioned crosswise below and in front of lower sieve 50. Clean grain auger 56 receives clean grain from each sieve 48, 50 and from bottom pan 58 of grain cleaning system 26. Clean grain auger 56 conveys the clean grain laterally to a generally vertically arranged elevator 60, which can also be referred to as a grain elevator, for transport to grain tank 28. Tailings from grain cleaning system 26 fall to a tailings auger on 62. The tailings are transported via tailings auger 64 and return auger 66 to the upstream end of grain cleaning system 26 for repeated cleaning action. A pair of grain tank augers 68 at the bottom of grain tank 28 convey the clean grain laterally within grain tank 28 to unloading auger 30 for discharge from combine 10. The non-grain crop material proceeds through a residue handling system 70. Residue handling system 70 may include a chopper, counter knives, a windrow door and a residue spreader.

Figure 2:
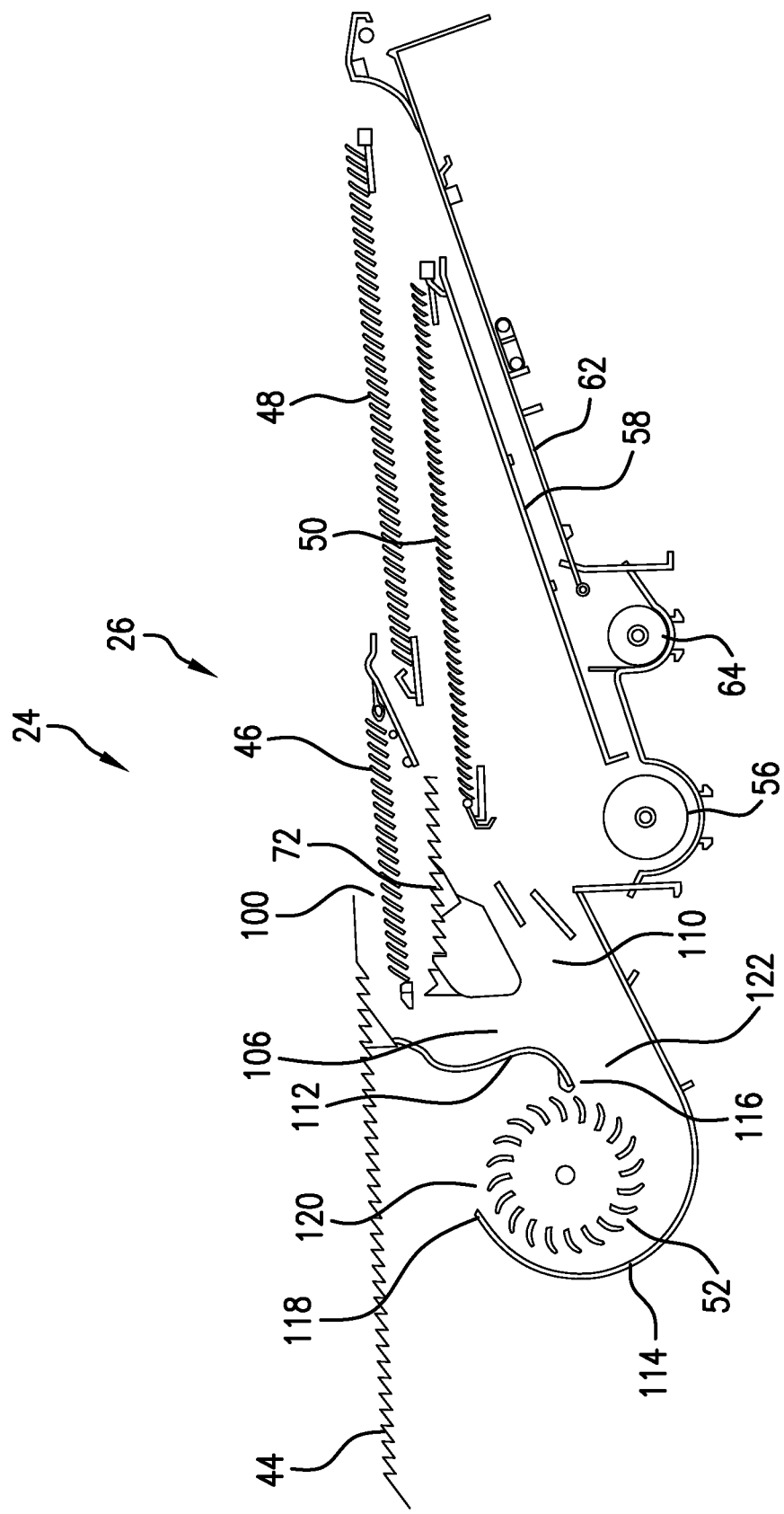
FIG. 2 is a cross-sectional view of a grain cleaning system that may be used with the combine of FIG. 1.

Referring now to FIG. 2, a grain cleaning system 26, is shown in cross-section. Prior to the grain cleaning system 26, the rotor 40 and perforated concave 42 (not shown in FIG. 2) operates to create a mat of the crop material and pass it through a narrow gap between the rotor 40 and the perforated concave 42 to thresh or separate the grains from the larger elements of MOG such as stems, stalks, leaves, pods, and plant fragments, such that a flow of the grain will be discharged into the grain cleaning system 26. This flow of grain will include some smaller elements of MOG, and falls on main grain pan 44. A reciprocating motion causes the mixture of grain and residual MOG to move rearwardly until it passes over a fall step 100. The mixture then falls on the pre-cleaning sieve 46, where a certain volume of the mixture of grain and residual MOG are separated, again under reciprocal motion of the pre-cleaning sieve. Excess volume of the mixture of grain and residual MOG passes over the pre-cleaning sieve 46 onto the upper or chaffer sieve 48. The grain cleaned by pre-cleaning sieve 46 and upper sieve 48 then falls through to lower or shoe sieve 50 for further cleaning, also under reciprocal motion. Because the pre-cleaning sieve 46 does not line up perfectly vertically with lower sieve 50, a grain transfer pan 72 reciprocally moves the partially cleaned grain rearwardly to fall onto the lower sieve 50.

Throughout this movement of the mixture of grain and residual MOG, a cleaning fan 52 blows air up past the ends of the main grain pan 44 and the grain transfer pan 72, and up through the pre-cleaning sieve 46, the upper sieve 48, and the lower sieve 50, by way of fan main outlet 122 leading to fan upper outlet 106 and fan lower outlet 110, guided by fan outlet air guide 112. Air enters the cleaning fan 52 at fan inlet 120 and is accelerated radially and tangentially, further guided by fan wrapper 114. Fan inlet 120 is partly defined by the terminus of fan wrapper 114, which is referred to as wrapper cut-off point 118, and by the terminus of fan outlet air guide 112, which is referred to as vortex cut-off point 116. In this way, the mixture of grain and residual MOG is suspended and separated as it passes through grain cleaning system 26. Some MOG is blown rearward toward the residue handling system 70 (not shown) as it passes over fall step 100. Clean grain falls through pre-cleaning sieve 46, upper sieve 48, and lower sieve 50 onto bottom pan 58 and descends into the clean grain auger 56, while additional MOG separated by the pre-cleaning sieve 46, the upper sieve 48, and the lower sieve 50 again blows rearward towards the residue handling system 70. Some grain and residual MOG that is difficult to separate passes over the pre-cleaning sieve 46, the upper sieve 48, and the lower sieve 50 and falls onto the tailings auger trough 62. These difficult to separate portions, called tailings, then descend into the tailings auger 64, where they are sent back through the threshing and separating system 24 by the return auger 66 (not shown).

Figure 3:
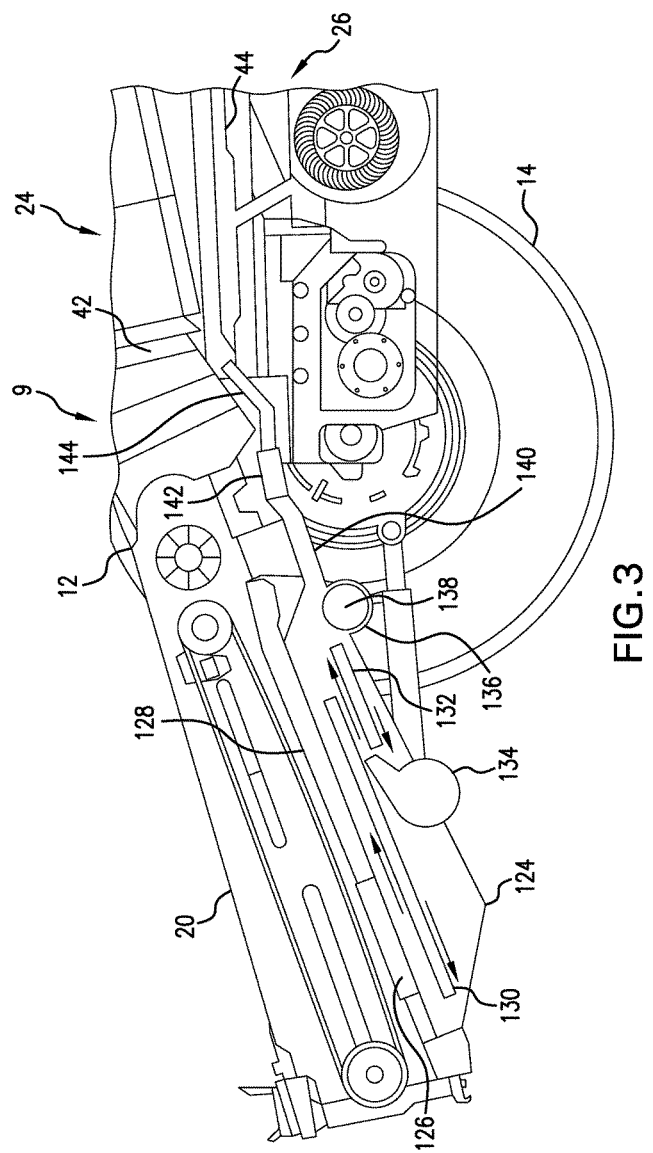
FIG. 3 is a partial side view of the combine of FIG. 1 showing one early grain extraction device.
Figure 5:
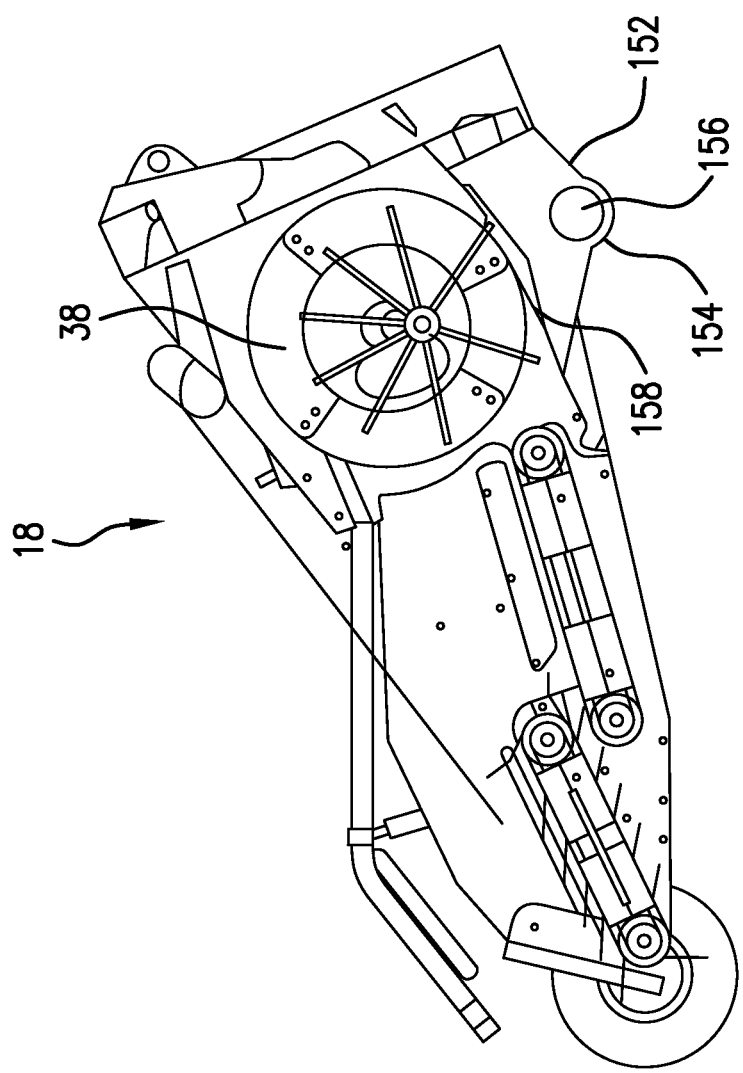
FIG. 5 is a side view of a header incorporating another early grain extraction device.
Figure 6:
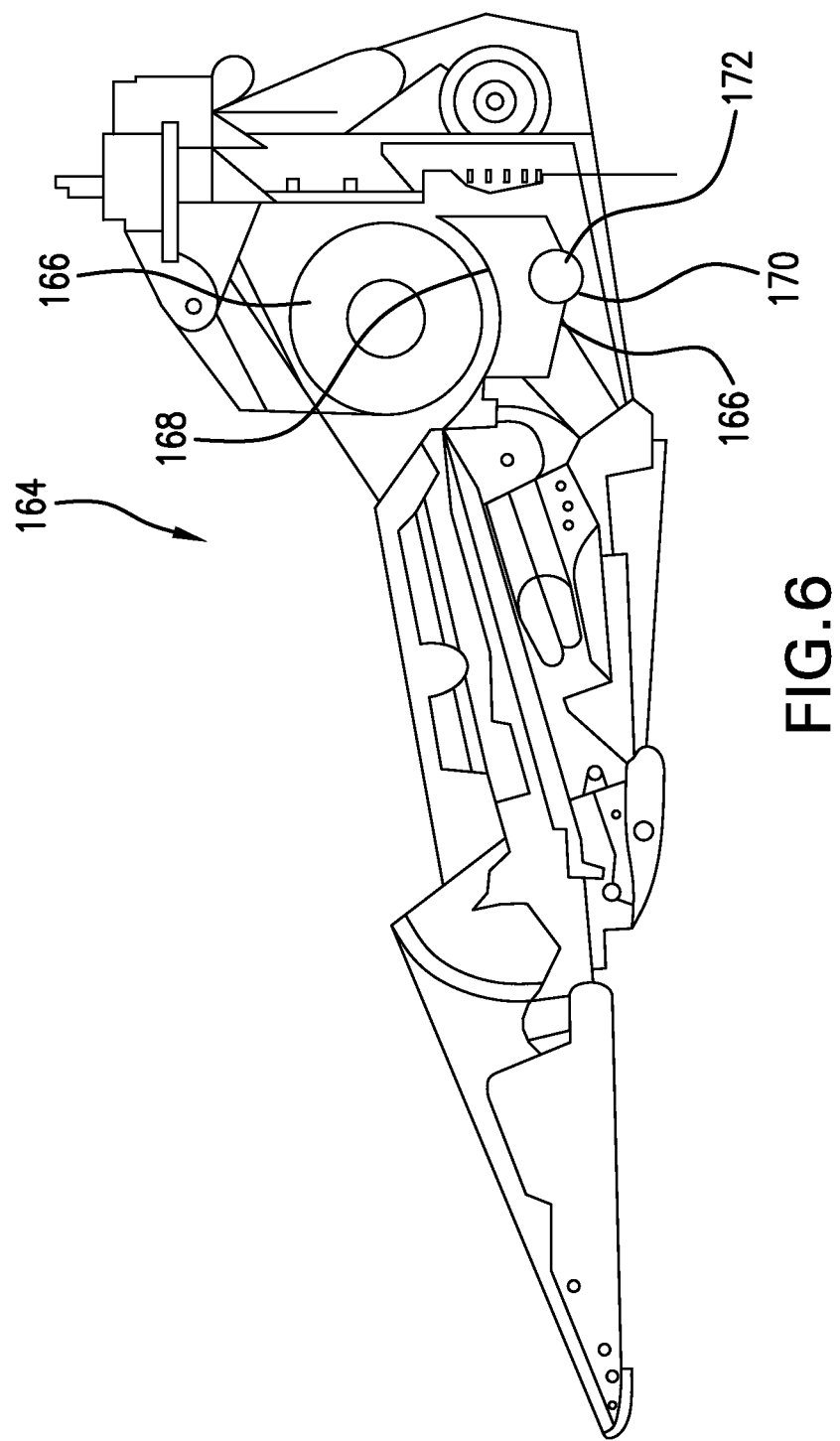
FIG. 6 is still another arrangement of an early grain extraction device applied to a combine header.

In accordance with the present invention an early grain extraction device is illustrated in different forms in FIGS. 3, 5 and 6. Referring particularly to FIG. 3 which shows a partial section view of the combine of FIG. 1, a grain collection housing 124 is positioned underneath the feeder housing 20 which has a perforated floor section 126 permitting passage of grain that has already been thrashed or separated into grain collection housing 124. The openings in perforated floor section 126 are selected to be large enough to pass the grain for the particular crop selected. The grain collection housing 124 extends from the forward section of feeder housing 20 to its aft end. Within the grain collection housing 124, an upper sieve 130 and lower sieve 132 are positioned to reciprocate and to move grain from the forward end of feeder housing 20 to its aft end. A blower 134 discharges air through the gap between upper sieve and lower sieve 130 and 132 to blow any tailings and chaff to and through a duct 140 past a flexible section 142 and through duct 144 to the duct 144 to the grain pan 44 to be acted on by the grain cleaning system 26. Grain collection housing 124 has a laterally extending auger trough 136 which contains an auger 138 extending across grain collection housing 124 for collection of the grain that has passed into auger trough 136.

Figure 4:
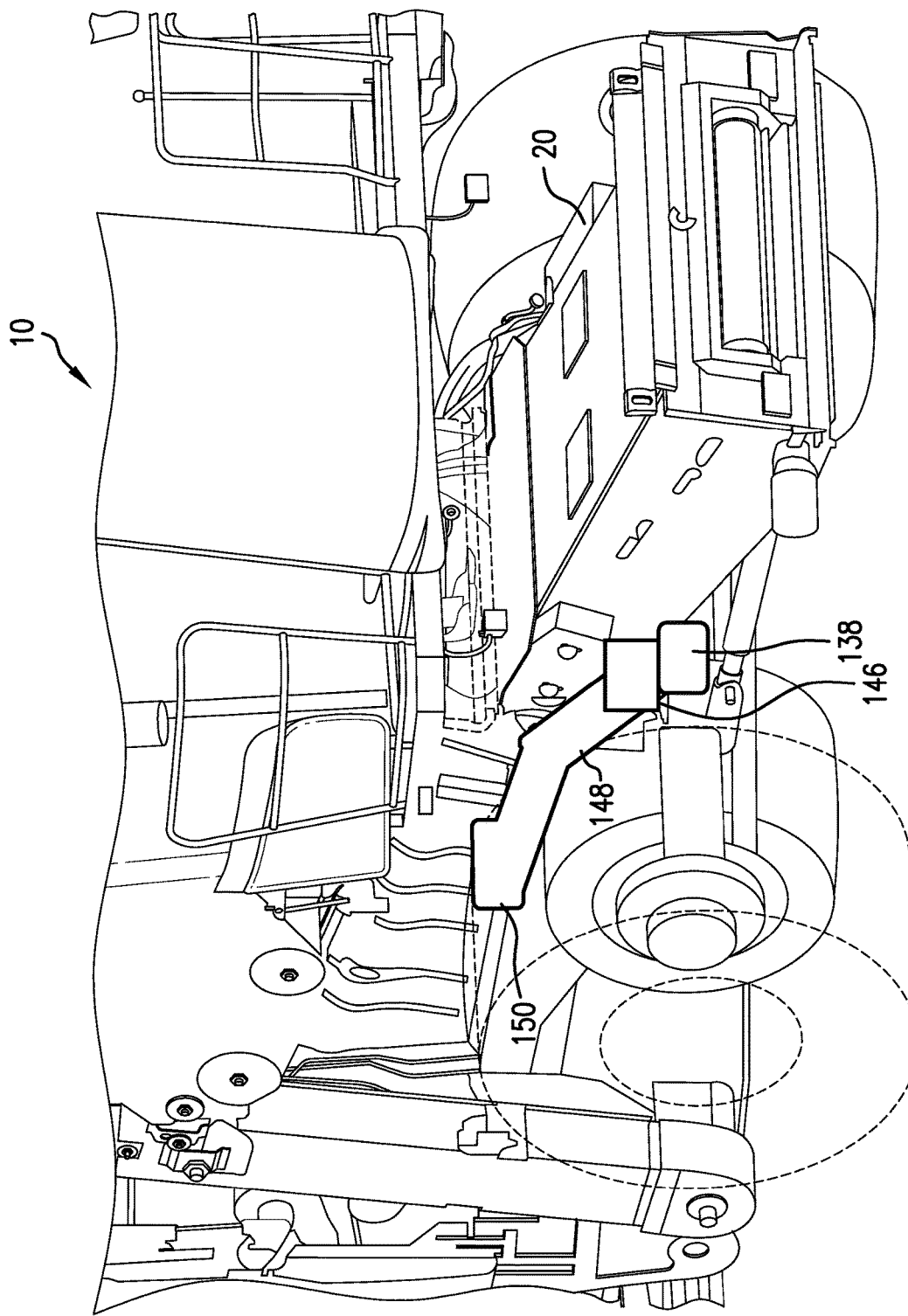
FIG. 4 is a perspective view of the combine of FIG. 3.

As shown in FIG. 4, the auger 138 discharges the grain to a pneumatic or mechanical conveyance device 146 which delivers it to a duct 48 leading to outlet 150 that deposits it in the cleaning system 26 of the combine 10. It should be noted that the pneumatic or mechanical conveyance device 146 may be an auger or a blower. In similar manner the sieve elements 130 and 132 may be conveyors delivering the material that has passed through the perforated floor section 126 to the aft end of grain collection housing 124.

The provision of the perforated floor section 126 allows early extraction of grain to be handled in a parallel fashion to the threshing and separating system 24. As a result, the capacity of the threshing and separating system 24 can be increased since it is not required to handle 100% of the crop material passing into the feeder housing 20. In like fashion, the tailings and chaff that have passed through floor section 126, also bypasses the threshing and separating system 24 to enable a further increase in capacity.

Figure 7:
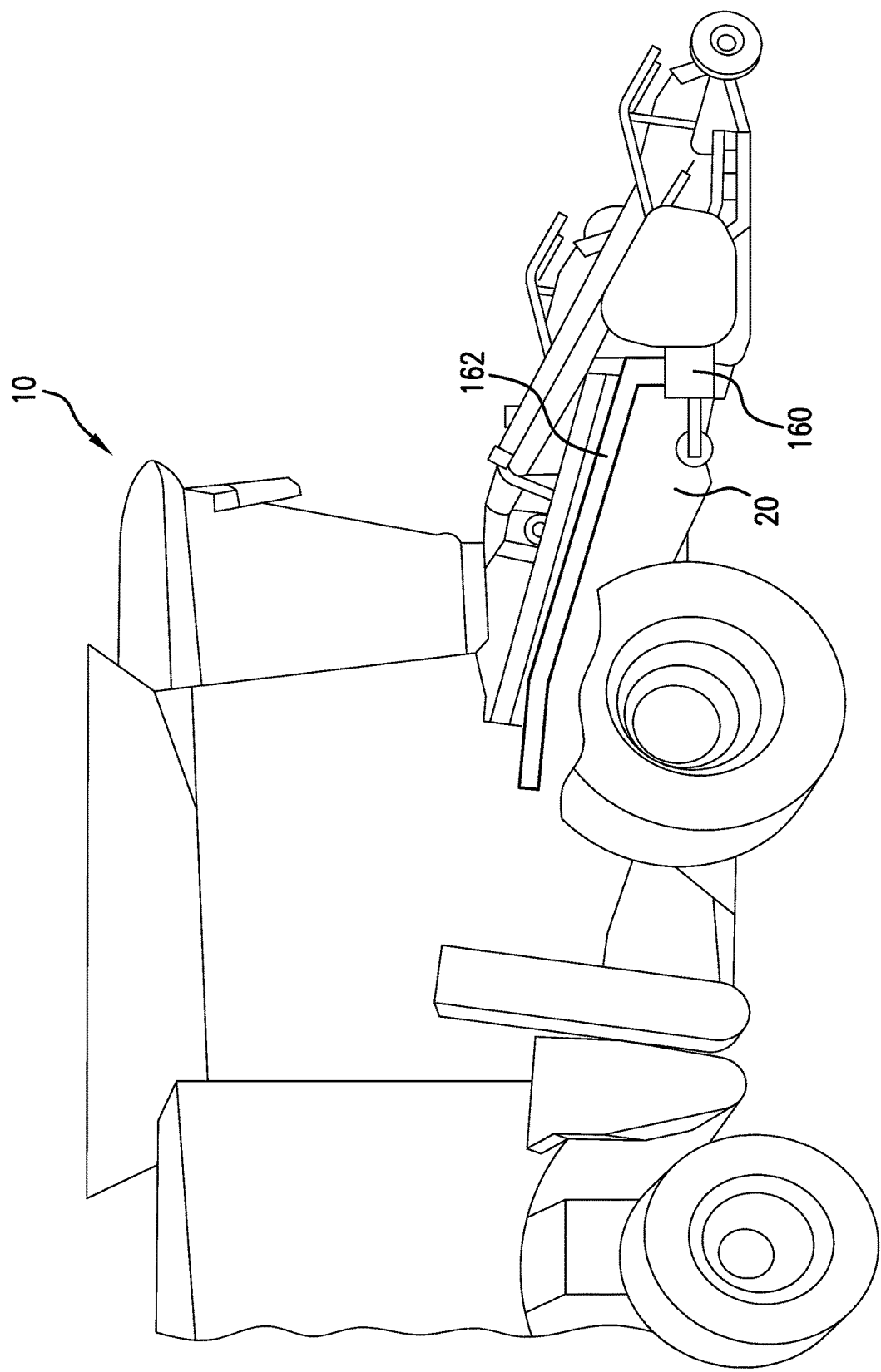
FIG. 7 is a side view of the header shown in FIG. 5.

The arrangement shown in FIGS. 3 and 4 illustrate application of early grain to the feeder housing 20. The arrangements illustrated in FIGS. 5 and 6 show the application of this technique to the header 18. Referring particularly to FIG. 5, header 18 has an auger 38 passing crop to the center and a grain collection housing 152 is positioned along and underneath auger 38 and has an auger trough 154 and auger 156 to move grain that falls through a perforated floor section 158 to one side of the header 18. As shown in FIG. 7, a conveyance device 160 receives grain from auger 172 and directs it through duct 162 to the cleaning system 26 of combine 10. As stated above, the conveyance device 160 may be pneumatic or mechanical. In this instance the early grain separation occurs even before the feeder housing 20.

Referring now to FIG. 6, the device is shown in connection with a corn head 164 that may be fitted to the combine 10. The harvested corn is transferred laterally in the corn head to the center by auger 166 and a grain collection housing 166 is fitted underneath and along auger 166. A perforated floor section 168 allows grain to pass there through into grain collection housing 166. An auger trough 170 is formed in the bottom of grain collection housing 166 and an auger 172 passes the grain to one side of the corn head for delivery to the grain cleaning system as illustrated in FIG. 7.

Figure 8:
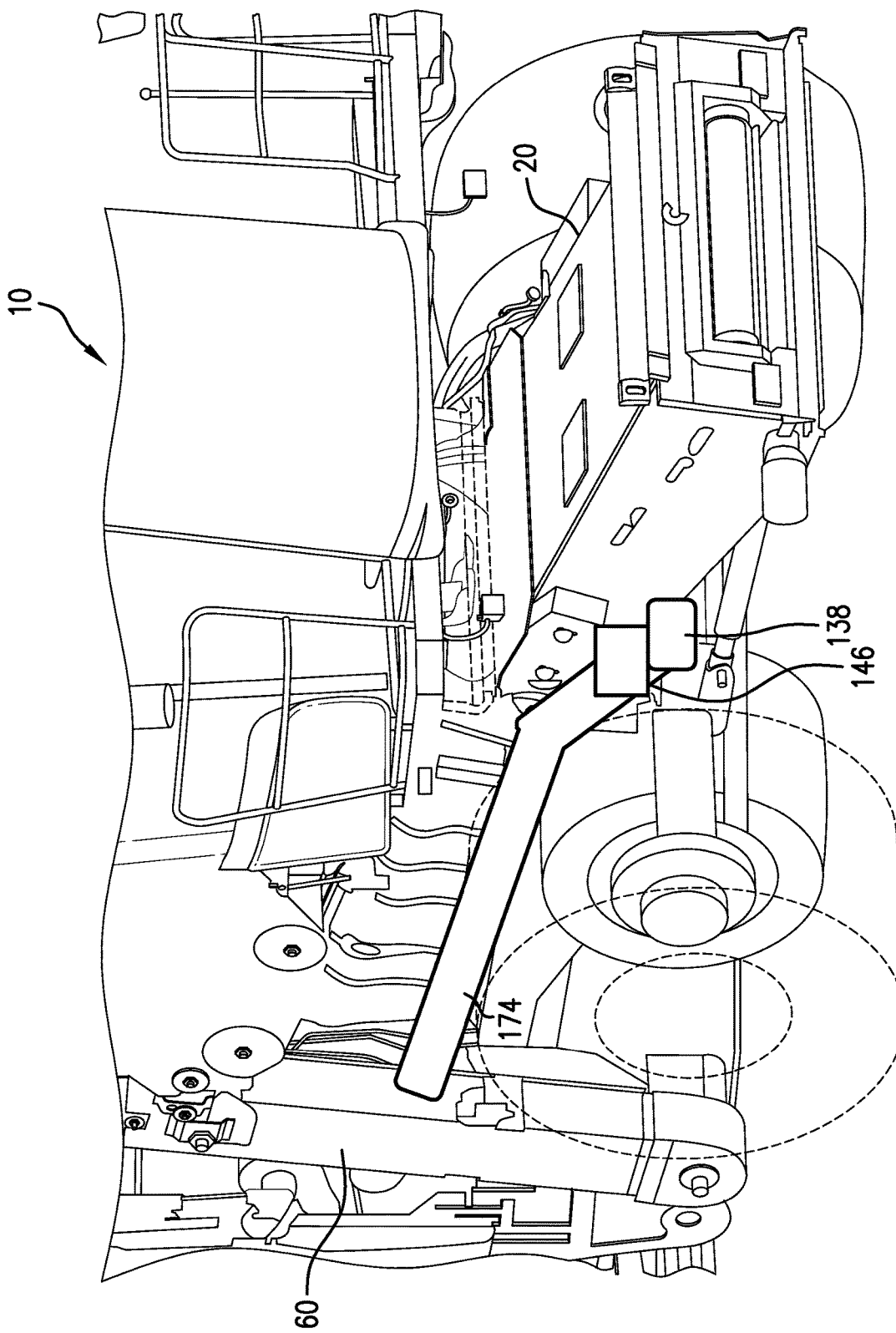
FIG. 8 is a perspective view of an alternate arrangement to FIG. 4.

An alternative to the delivery of early extracted grain to the cleaning system is shown in FIG. 8 in which the auger 138 in the feeder housing 20 connects to a conveyance device 146 connecting to a duct 174 leading to the grain elevator 160. This may be used when the grain thus collected is particularly clean and free of debris.

In all of the embodiments set forth and described above, the early extraction of grain is provided simply by a perforated floor section leading to a chamber and conveying devices within the chamber to move the grain to the appropriate system within the combine. The design has the benefit of a minimum of extra complexity and cost and allows a parallel path for grain to permit greater capacity in the threshing and separating system 24 of the combine 10.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A combine comprising:
    a mobile frame having a power unit;
    a harvesting header mounted on said mobile frame for removing crop material from the field and feeding it to a central location;
    a threshing and separating system mounted on said mobile frame for separating grain from crop material;
    a feeder housing mounted on said frame for receiving crop material from said harvesting head and conveying it to said threshing and separating system;
    a grain tank mounted on said mobile frame;
    a conveyor for transferring separated grain to said grain tank;
    said feeder housing having a perforated floor section, the perforations being open enough to pass grain therethrough;
    a grain collection housing positioned underneath one of said feeder housing and header for receiving grain;
    a pair of conveyors positioned beneath said perforated floor section within said grain collection housing to receive grain and an auger receiving the grain for discharge from said grain collection housing to deliver it downstream to one of said threshing and separating system and separated grain conveyor; and,
    a pneumatic blower between said pair of conveyors for blowing material other than grain (MOG) from the grain.

2. The combine as claimed in claim 1, wherein said harvesting header has a perforated floor section.

3. The combine as claimed in claim 2, wherein said conveyor within said grain collection housing is an auger.

4. The combine as claimed in claim 3, wherein the grain is directed from said header to downstream of said threshing and separating system.

5. The combine as claimed in claim 3, wherein the grain is directed to the separated grain conveyor.

6. The combine as claimed in claim 1, wherein said blower is variable speed.

7. The combine as claimed in claim 1, further comprising a cleaning system on said mobile frame and a duct from between said pair of conveyors to the cleaning system.

8. The combine as claimed in claim 1, further comprising a duct and one of mechanical and pneumatic conveyance device to deliver the separated grain to one of downstream of the threshing and separating system and said separated grain conveyor.

\* \* \* \* \*